United States Patent [19]

Hellon et al.

[11] Patent Number: 5,352,055
[45] Date of Patent: Oct. 4, 1994

[54] LOCKING MEMBER AND STABILIZER BAR/LOCKING MEMBER COMBINATION

[75] Inventors: Keith Hellon, Libertyville, Ill.; Gerald D. Nickerson, Gibraltar, Mich.

[73] Assignee: Mac Lean Fogg Company, Mundelein, Ill.

[21] Appl. No.: 915,079

[22] Filed: Jul. 16, 1992

Related U.S. Application Data

[63] Continuation-in-part of Ser. No. 660,132, Feb. 22, 1991, Pat. No. 5,145,273.

[51] Int. Cl.$^5$ .............................................. F16D 1/00
[52] U.S. Cl. ..................... 403/24; 403/368; 403/344; 403/195
[58] Field of Search ............... 403/24, 368, 344, 195, 403/371, 71; 174/153 G, 152 G, 65 G

[56] References Cited

U.S. PATENT DOCUMENTS

| | | | |
|---|---|---|---|
| 1,806,176 | 5/1931 | Owens . | |
| 1,832,138 | 11/1931 | Pounder | 403/368 |
| 2,062,290 | 12/1936 | Bott | 403/368 |
| 2,294,398 | 9/1942 | Ferguson | 403/371 |
| 2,347,044 | 4/1944 | Frances | 235/115 |
| 2,441,304 | 5/1948 | West | 403/368 |
| 2,592,130 | 4/1952 | Erb et al. | 174/163 |
| 2,706,114 | 4/1955 | Castello | 267/57 |
| 2,738,185 | 3/1956 | Coskun | 248/56 |
| 2,784,606 | 3/1957 | Schilling | 403/371 |
| 3,056,852 | 10/1962 | Sachs | 174/153 |
| 3,366,355 | 1/1968 | Fisher | 248/56 |
| 4,030,741 | 6/1977 | Fidrych | 285/161 |
| 4,033,535 | 7/1977 | Moran | 248/56 |
| 4,108,507 | 8/1978 | Renner et al. | 308/238 |
| 4,140,413 | 2/1979 | Conrad | 403/371 |
| 4,799,818 | 1/1989 | Sudimak . | |
| 5,145,273 | 9/1992 | Hellon . | |

FOREIGN PATENT DOCUMENTS

| | | |
|---|---|---|
| 0381566A1 | 8/1990 | European Pat. Off. . |
| 0405109A1 | 1/1991 | European Pat. Off. . |
| 1373436 | 10/1963 | France . |
| 171164 | 10/1982 | Japan ............ F16J 15/52 |

OTHER PUBLICATIONS

Advertisement of Bikon Corporation, Thomas Register 1989.
Advertisement of Ringfeder, Ringfeder Corporation, Westwood, N.J. (no date available).

*Primary Examiner*—Randloph A. Reese
*Assistant Examiner*—Anthony Knight
*Attorney, Agent, or Firm*—Willian Brinks Hofer Gilson & Lione

[57] ABSTRACT

A locking member for a stabilizer bar includes a deformable inner element and a substantially rigid outer element. The outer element is shaped to accept the inner element. The inner element includes a tapered section, and the outer element includes a tapered section engageable with the tapered section on the inner element for applying a clamping force to the bar for holding the locking member on the bar. The outer element includes a flange that supplies the outer element with sufficient structural integrity to permit deformation of the inner element while strengthening the outer element against radial deformation.

19 Claims, 4 Drawing Sheets

LOCKING MEMBER AND STABILIZER BAR/LOCKING MEMBER COMBINATION

CROSS REFERENCE TO RELATED APPLICATION

This application is a continuation-in-part of the U.S. patent application of Hellon et al., Ser. No. 07/660,132, filed on Feb. 22, 1991, now U.S. Pat. No. 5,145,273, which is hereby incorporated by reference in its entirety.

BACKGROUND OF THE INVENTION

1. Field of the Invention

This invention is directed to a two element locking member, particularly for use in maintaining a stabilizer bar of an automotive suspension system in a relatively stationary position. The invention is additionally directed to an automotive stabilizer bar having a two element locking member of this invention assembled on the stabilizer bar.

2. Description of Related Art

Stabilizer bars are torsion springs which conduct movement of an automotive suspension from one side of an automobile to the other, and they are commonly used to reduce the tendency of a chassis to roll during cornering. A stabilizer bar is usually mounted to the chassis of an automobile by means of resilient bushings. For proper operation, the stabilizer bar should be free to rotate in the bushings, yet restricted from movement the bushings along the length of the stabilizer bar.

One common approach to controlling the movement of a stabilizer bar along its length includes forming an annular upset ridge on the stabilizer bar in a hot forming operation. This ridge is positioned to contact an edge of an adjacent bushing to hold the stabilizer bar in place. Because the annular ridge is formed by a hot pressing operation, a large capital expenditure is required for the necessary tooling, and the maximum size of the ridge is limited. In extreme cases, the ridge may actually move into the rubber bushing, holding the stabilizer bar out of the centered position.

Another approach involves placing a length of a rubber hose and a hose clamp on the stabilizer bar to form a stop which limits axial movement of the stabilizer bar.

The invention of the above-referenced parent patent application of Hellon et al., Ser. No. 07/660,132, provides an improved means for maintaining a stabilizer bar in a selected position, which avoids the need to create an upset ridge on the stabilizer bar, and which can be quickly installed.

While the prior art locking member disclosed in that parent patent application performs its functions well, there is always room for improvement. The invention of this continuation-in-part application represents such an improvement. Specifically, the present invention provides a locking member which can withstand higher stresses encountered with maximum tolerances on a stabilizer bar. The locking member of the invention can be configured to increase the amount of force necessary to induce axial shifting of the stabilizer bar with respect to the locking member, and also to present greater resistance to radial deformation thereof. The locking member described below is also less expensive to manufacture.

SUMMARY OF THE INVENTION

According to a first aspect of this invention, a two element locking member comprises an inner element, an outer element, and a strap interconnecting the inner and outer elements. The inner element comprises at least first and second portions which are joined to each other by at least one hinge at one end of the each of the two portions. Each of the portions comprises a first tapered surface, tapered along a longitudinal axis of the inner element, and the outer element comprises a second tapered surface, tapered along an axis of the outer element. The tapered surfaces are oriented to allow insertion of the inner element into the outer element, and they generate clamping forces tending to hold the locking member in place once the two elements are assembled.

According to a second aspect of this invention, a locking member comprises inner and outer elements as described above. At least one locking ridge is positioned on one of the inner and outer elements, and at least one ramp is formed on the other of the inner and outer elements to receive the locking ridge. The length of the ramp is less than the length of the first tapered surface along the first axis, and the first and second tapered surfaces are oriented to allow insertion of the inner element into the outer element.

The two element locking member is installed on a stabilizer bar by placing the first and second portions around the stabilizer bar and sliding the outer element over the inner element such that the tapered surfaces clamp the inner element in place on the bar. Once assembled, the locking member is substantially fixed in position on the bar and acts as a stop that cooperates with the bushing to hold the bar in a centered position.

This invention is also directed to an automotive stabilizer bar having a two element locking member applied thereto. This locking member comprises an inner element and an outer element, wherein the inner element comprises at least two portions. Each of the portions comprises an interior surface in contact with the stabilizer bar and an external surface, and one of the surfaces of each of the portions defines a first tapered surface which is tapered along an axis of the inner element. The outer element comprises an interior surface in contact with the inner element and an external surface, and the interior surface of the outer element defines a second tapered surface which is tapered along an axis of the outer element. The first and second tapered surfaces cooperate to generate an inwardly directed clamping force which clamps the inner element in position on the stabilizer bar.

The two element locking member of this invention has a number of advantages. It is relatively inexpensive to produce, and it eliminates the high tooling cost needed to form the upset ridge of the prior art. The strap and hinge cooperate to maintain the entire locking member as a unitary assembly prior to insertion of the inner element into the outer element, thereby simplifying assembly, inventorying and purchasing.

The present invention further provides an alternative embodiment of a stabilizer bar locking member. In this alternative embodiment, the locking member comprises a deformable inner element and a substantially rigid outer element. The outer element has a radius and dimensions sufficient for accepting the inner element. The outer element includes a flange for supplying the outer element with sufficient structural integrity for permitting deformation of the inner element while strengthening the outer element against radial deformation. Tapered sections can be provided on the inner and outer elements for generating clamping forces.

DETAILED DESCRIPTION OF THE PRESENTLY PREFERRED EMBODIMENTS

Figure 1:
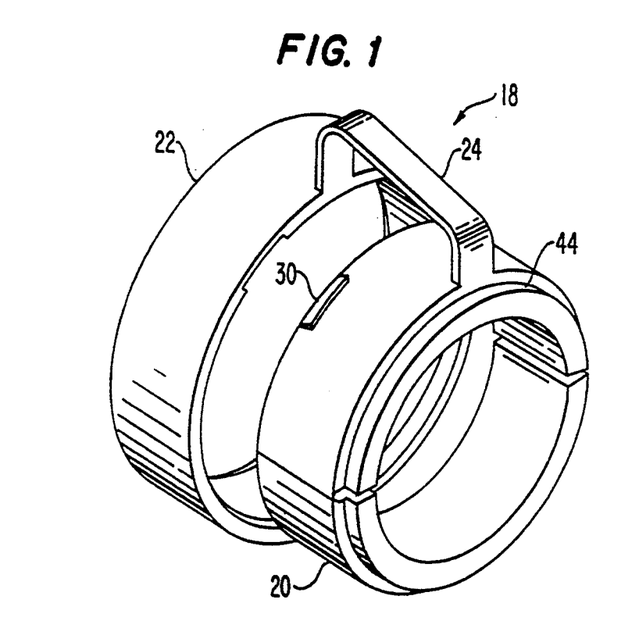
FIG. 1 is a perspective view of a preferred embodiment of the two element locking member of this invention.

Turning now to the drawings, FIG. 1 shows a two element locking member 18 comprising an inner element 20 and an outer element 22. The inner element 20 is attached to the outer element 22 by a flexible strap 24, and the elements 20, 22 and the strap 24 are preferably molded as an integral unit. The inner and outer elements 20, 22 are shown in detail in FIGS. 3, 4, and 5.

Figure 3:
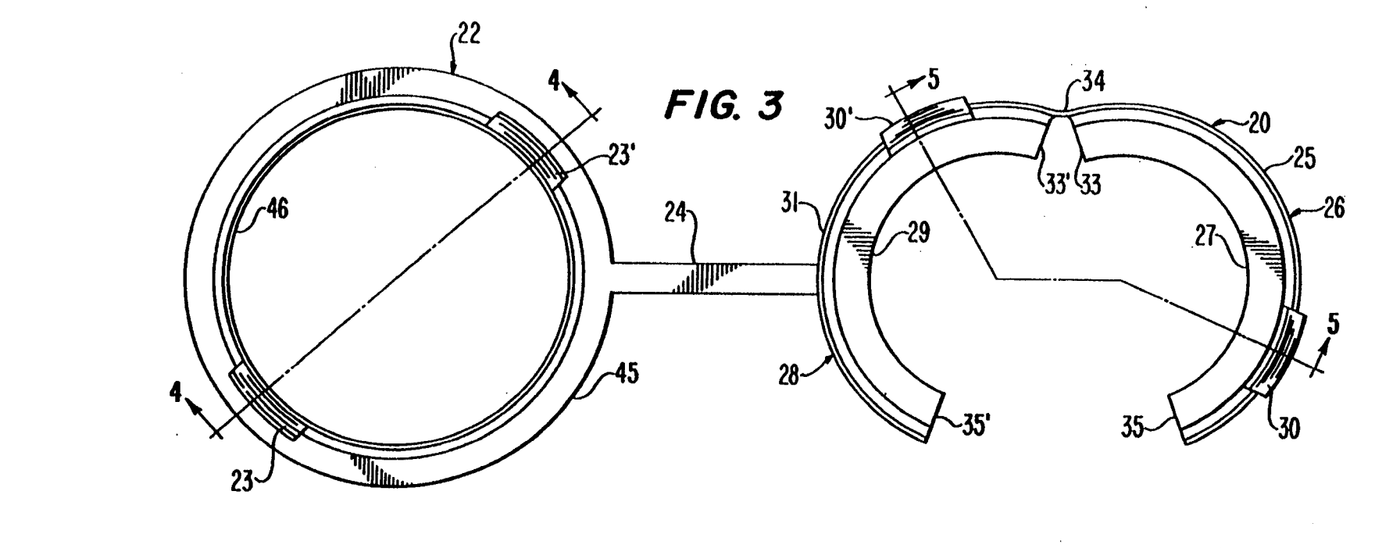
FIG. 3 is a top view of the locking member of FIG. 1.

As illustrated in FIG. 3, the inner element 20 includes first and second portions 26, 28 which are joined to each other at ends 33, 33' by a living hinge 34. Each of the two portions 26, 28 defines an interior surface 27, 29 and an external surface 25, 31. Each of the two portions 26, 28 also defines a locking ridge 30, 30' which locks the inner element 20 within the outer element 22 as described below. When the first portion is brought into contact with the second portion, the two portions 26, 28 define a substantially annular shape.

The opposed ends 35, 35' of each of the two portions are shaped in such a manner that a gap is formed therebetween when the inner element 20 is placed around a stabilizer bar as described below. This gap allows the inner element 20 to accommodate stabilizer bars having a range of diameters.

Figure 2:
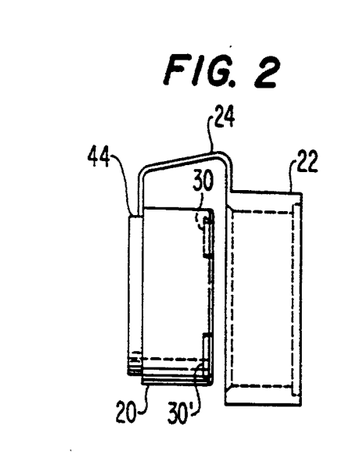
FIG. 2 is a side view of the locking member of FIG. 1.
Figure 5:
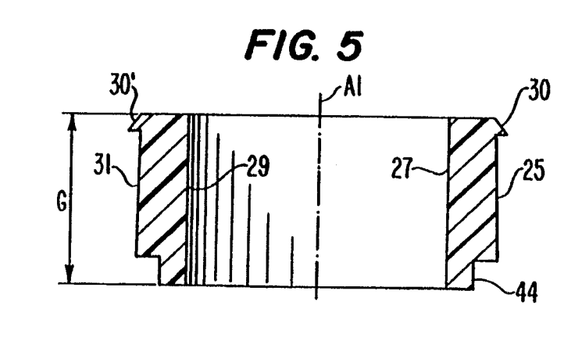
FIG. 5 is a cross-sectional view taken along line 5—5 of FIG. 3.

The interior surfaces 27, 29 are circularly cylindrical and the external surfaces 25, 31 define first tapered surfaces (FIGS. 1, 2 and 5). The first tapered surfaces extend substantially along the entire width of the external surfaces 25, 31. In this preferred embodiment, each of the first tapered surfaces is a portion of a frusto-conical surface oriented at an angle of about 1° to 5° (preferably about 2°) with respect to the longitudinal axis A1.

Figure 4:
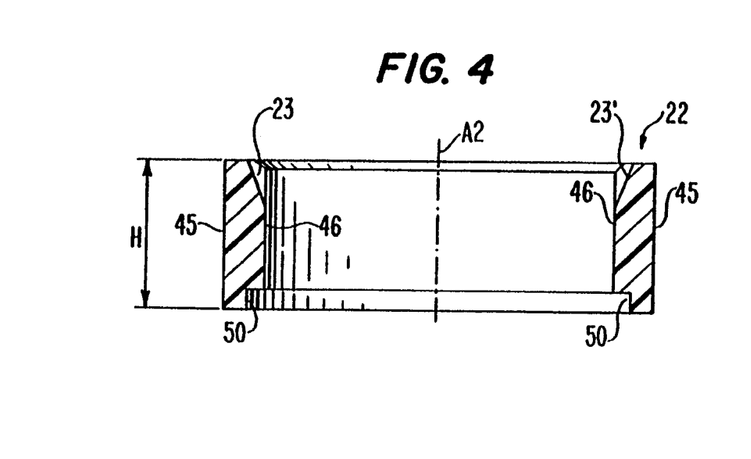
FIG. 4 is a cross-sectional view taken along line 4—4 of FIG. 3.

Turning now to FIG. 4, the outer element 22 comprises a unitary ring having an external surface 45 and an interior surface 46. The interior surface 46 of the outer element 22 defines recessed ramps 23, 23' oriented to receive the ridges 30, 30', respectively (FIG. 3). The ramps 23, 23' are shaped to facilitate insertion of the ridges 30, 30' into the outer element 22. The interior surface 46 also defines a second tapered surface extending substantially along the entire width of the interior surface 46 along the longitudinal axis A2. In this preferred embodiment, the second tapered surface also is a frusto-conical surface which defines an angle of about 1° to 5° (preferably about 2°) with respect to the axis A2. The ramps 23, 23' are shorter than the second tapered surface along the axis A2 to maximize the area of the second tapered surface. The outer element 22 also defines a flange 50 (FIG. 4) for receiving the ridges 30, 30'.

Figure 6:
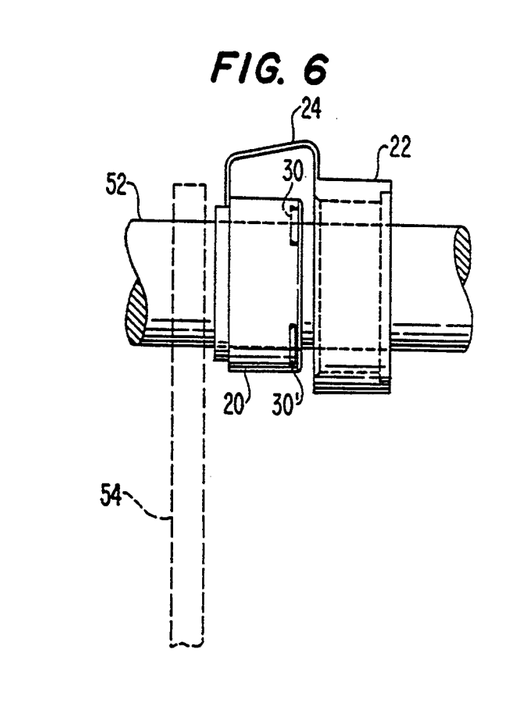
FIG. 6 is an illustration of the locking member of FIG. 1 positioned on a stabilizer bar, prior to assembly.
Figure 7:
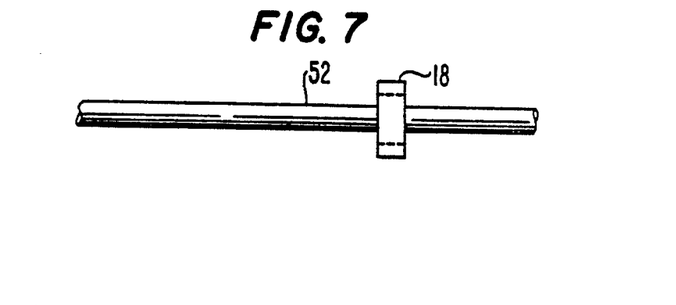
FIG. 7 is an illustration of the stabilizer bar of FIG. 7 with the locking member fully assembled.

FIG. 7 shows the locking member 18 placed about a stabilizer bar 52 which is supported by a frame 54. Both the stabilizer bar 52 and the frame 54 are conventional in the art. FIG. 6 shows the locking member 18 prior to assembly and FIG. 7 shows the stabilizer bar 52 with the locking member 18 fully assembled. The first and second tapered surfaces defined by the external surfaces 25, 31 and the interior surface 46 provide a clamping force that secures the inner element 20 on the stabilizer bar 52. The ridges 30, 30' lock the inner element 20 in the assembled position in the outer element 22, and the assembled locking member acts as a stop to locate the stabilizer bar 52.

The following details of construction are provided merely as an example, and are not to be construed as limiting. In this embodiment, the width of the ridges 30, 30' is preferably 9.5 mm, the internal taper of the ramps 23, 23' is 20°, the depth of the ridge 50 is 2 mm, the height H (FIG. 4) of the outer element 22 is 16 mm and the height G (FIG. 5) of the inner element 20 is 18.2 mm. The beveled surface of each locking ridge 30, 30' is preferably oriented at an angle of about 45° with respect to the axis A1. Both portions 26, 28, the strap 24 and the hinge 34 are preferably made of a thermoplastic material such as Nylon 6/6 and are preferably injection molded as a single unit. The outer element 22 is highly stressed, and for this reason it is preferred to inject the thermoplastic material that forms the outer element 22 radially outwardly via a gate that extends over 360°, and then to force the material axially through the mold. Additives such as rubber or glass fibers may be mixed with the thermoplastic material to obtain the desired structural properties.

Figure 8:
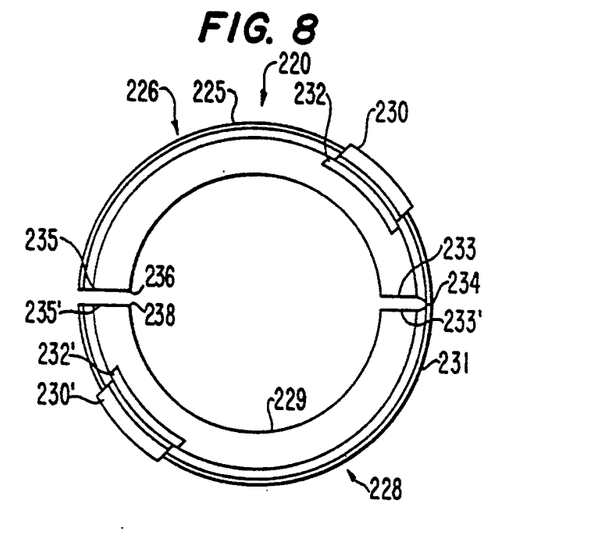
FIG. 8 is an end view of the inner element of an alternative embodiment of the locking member of this invention.
Figure 9A:
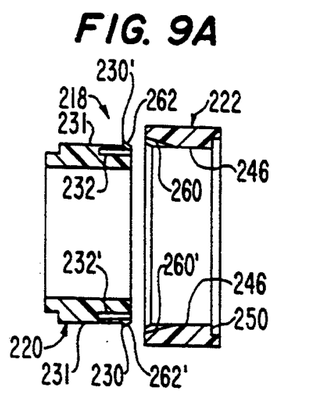
FIGS. 9A, 9B and 9C are cross-section illustrations of the assembly of the inner element of FIG. 8 with an outer element similar to that of FIG. 4.
Figure 9B:
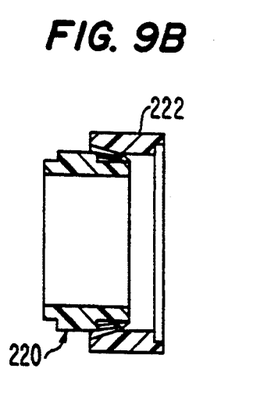
Figure 9C:
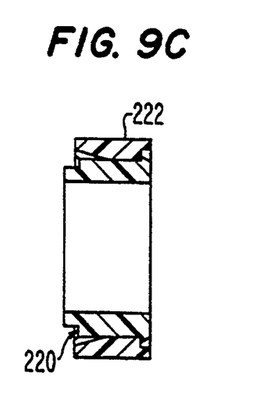

FIGS. 8 and 9 illustrate an alternative embodiment of the invention. In FIGS. 8 and 9 parts of the alternative embodiment which correspond to numbered parts of the embodiment of FIGS. 1–7 are numbered with a prefix of "200," followed by the numeral corresponding to the numeral used to identify the corresponding parts of the embodiment of FIGS. 1–7. For example, the living hinge 34 of FIG. 3 corresponds to the living hinge 234 of FIG. 8.

The primary difference between the embodiment of FIGS. 8 and 9 and the embodiment of FIGS. 1–7 is that the inner element 220 defines recesses 232, 232' beneath and in alignment with the ridges 230, 230'. These recesses are positioned to provide a space into which the ridges can move when compressed by the outer element 222 during assembly.

As shown in FIGS. 9A–9C, the inner element 220 is inserted into the outer element 222 in such a fashion that the ridges 230, 230' are elastically deformed inwardly. This deformation is facilitated by the openings 232, 232' which reduce stress on the ridges. Once the inner element 220 is fully inserted into the outer element 222 and the ridges protrude on the opposite side of the outer element, they are engaged by the outer element in the flange 250 (see FIG. 9C).

In another variation, the locking means for locking the inner element 20 within the outer element 22 may comprise a suitable adhesive between mating surfaces. A suitable adhesive is a micro-encapsulated epoxy such as that supplied by 3M Company. At the time of assembly, the capsules are broken, thereby activating the epoxy. Another approach to retaining the two elements together is to rely on the friction between the inner and the outer elements 20, 22. This friction may be increased by roughening the surfaces 25, 27, 29, 46 by sand-blasting the mold surfaces used to form these surfaces, as for example with an 60–1000 (preferably about 160) aluminum oxide grit. This enhances the frictional grip between the interior surface of the inner element and the stabilizer bar, as well as between the interior surface of the outer element and the external surface of the inner element.

The inner element can also be welded to the outer element for example by sonic welding to hold the assembled locking member together. The combination of any of these means can also be used. For example, the mechanical interlock illustrated in the embodiments of FIGS. 1–9 can be combined with roughened mating surfaces.

The embodiments described above provide a number of significant advantages. The strap 24 automatically aligns the inner element 20 with the outer element 22 for assembly. This is particularly important if the locking ridges 30, 30' are to cooperate with the ramps 23, 23'. The living hinge 34 also facilitates assembly of the locking member 18. In the event adhesive is used to secure the inner element 20 to the outer element 22, the strap 24 can be used to support the inner element as it is dipped in the adhesive, while the outer element 22 is held out of the adhesive.

The locking member functions reliably on bars that vary in diameter by ±0.25 mm. The inner and outer elements 20, 22 are dimensioned to grip a bar at the smaller end of the anticipated range of bar diameters. When the inner element is applied to a larger diameter bar a gap is formed between adjacent ends of the first and second portions 26, 28, and the outer element 22 expands to accommodate the increased diameter of the inner element 20.

Yet another embodiment of the present invention is illustrated in FIGS. 10 through 14, which show a locking member 100 comprising an inner element 102 and an outer element 104. As opposed to the above-described locking member 18, it is to be noted that the elements 102 and 104 do not possess interlocking ramps 23, 23' and ridges 30, 30', and are not interconnected by a flexible strap 24. Thus, the inner element 102 and the outer element 104 can be constructed from different materials. It is envisioned, however, that the elements 102 and 104 could be interconnected by a suitable strap or tether if desired.

Figures 10, 11, 12:
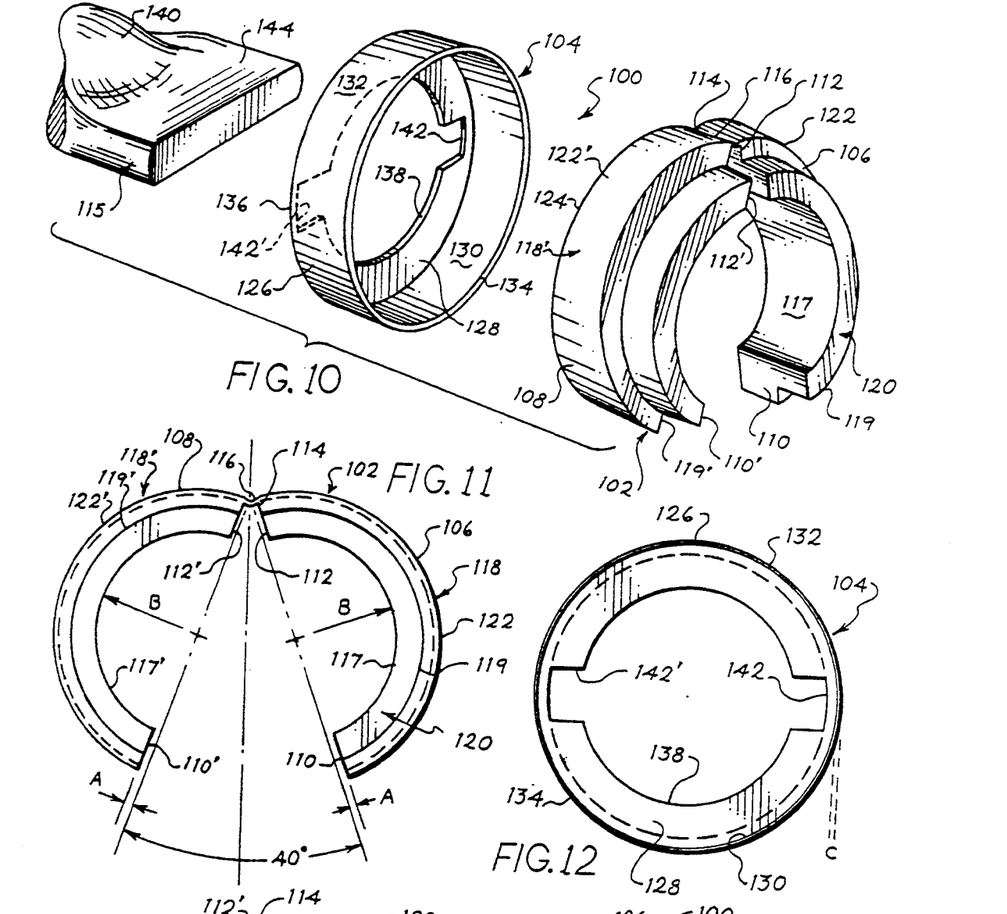
FIG. 10 is an exploded perspective view of yet another embodiment of the two element locking member of this invention.
FIG. 11 is a front elevational view of the inner element illustrated in FIG. 10.
FIG. 12 is a front elevational view of the outer element illustrated in FIG. 10.

Turning to FIG. 11, the inner element 102 generally comprises a substantially semi-annular first portion 106 and a substantially semi-annular second portion 108, each having opposite ends 110, 112 and 110', 112', respectively. The end 110 on the portion 106 opposes the end 110' on the portion 108, and the end 112 is joined to the end 112' by a living hinge 114 which functions substantially similarly to the hinges 34, 234, and joins the portions 106 and 108 together. When the portions 106 and 108 are properly oriented, the portions 106 and 108 form a substantially annular configuration for surrounding a stabilizing bar 115. The ends 112 and 112' are each offset from a midpoint 116 of the hinge 114 by a distance, indicated by the letter "A" in FIG. 11.

Figure 13:
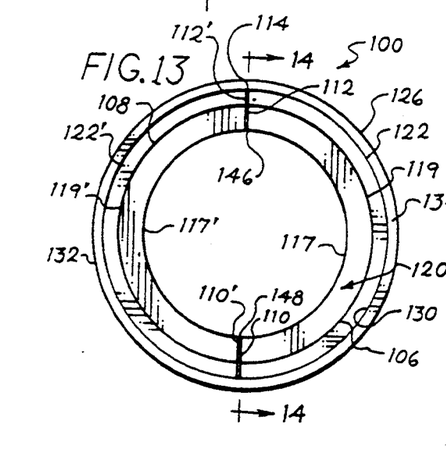
FIG. 13 is an assembled front elevational view of the elements of FIGS. 11 and 12.

The portions 106 and 108 each define an inner surface 117, 117' and an outer surface 118, 118'. The inner surfaces 117, 117' are concavely shaped, whereas the outer surfaces 118, 118' are convexly shaped. The concave configuration of the inner surfaces 117, 117' is defined by a radius, indicated by the letter "B" in FIG. 11. Also, when the portions 106 and 108 are positioned to form the bar surrounding annulus, as shown in FIG. 13, the inner surfaces 117, 117' form a substantially cylindrical surface which engages an outer surface of the bar 115, while the outer surfaces 118, 118' form a tapered surface which is engaged by the outer element 104, as discussed below.

Whereas the inner surfaces 117, 117' are defined by a radius "B" that is constant throughout the axial length of the element 102, the outer surfaces 118, 118' are defined by a diameter that does not remain constant throughout the entire axial length of the element 102. As is shown in FIG. 13, the outer surfaces 118, 118' each comprise a substantially constant diameter section 119, 119' adjacent a bar entering end 120 of the element 102. The sections 119, 119' extend axially along the outer surfaces 118, 118' a predetermined distance sufficient to form a bearing surface for an adjacent isolator block disposed on a particular vehicle. This protects the outer element 104 from contact with the isolator block.

Tapered sections 122, 122' of the surfaces 118, 118' extend from ends of the sections 119, 119' opposite to the entering end 120 to a back end 124 of the element 102. The tapered sections 122, 122' define an angle, indicated by the character "α" in FIG. 14, measuring within the range of 1° to 5°, and preferably of 2°, with respect to the longitudinal axis A3 of the element 102. The angle slopes upwardly from the back end 124 towards the entering end 120 such that the entering end 120 is dimensionally larger than the back end 124. The tapered sections 122, 122' are intended to mate with complementary tapered sections on the outer element 104, as will be discussed in greater detail later. The tapered surfaces 122, 122' provide the member 100 with the same functional benefits as those discussed above with respect to the member 18.

Figure 14:
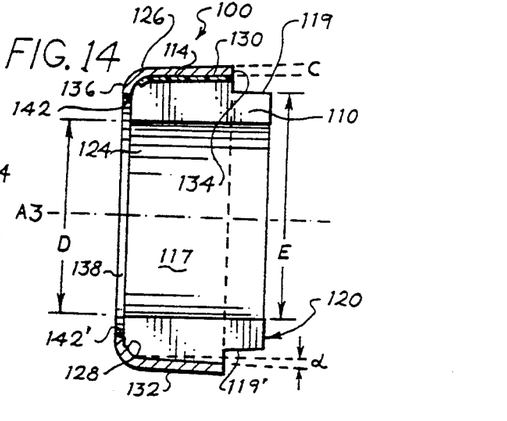
FIG. 14 is a sectioned side elevational view, taken along line 14—14 of FIG. 13, of the locking member of FIG. 10.

As shown in FIGS. 10, 12 and 14, the element 104 has a substantially cylindrical, cup-like configuration comprising an axially extending annulus or tapered portion 126 and a radially extending flange portion 128. The axially extending portion 126 defines an inner surface 130 and an outer surface 132, and the element 104 defines a bar entering end 134 and a back end 136. The tapered portion 126 has a thickness, indicated by the character "C" in FIGS. 12 and 14. The thickness of the portion 126 is reduced, as compared to the thicknesses of the corresponding portions of the member 18, thereby reducing an effective area for application of a force which might disengage the elements 102 and 104 or allow the bar 115 to axially shift within the member 100.

The flange portion 128 extends radially inwardly from the axial portion 126 at the back end 136 by a distance sufficient to define a substantially circular aperture 138 at the back end 136 of the element 104. It is to be noted that, while, in the illustrated embodiment, the portion 128 is shown projecting radially inwardly from the portion 126, the portion 128 may be oriented to extend radially away from the portion 126. This latter construction of the portion 128, however, increases the effective radial dimensions of the member 100, which may be undesirable for certain applications.

The aperture 138 is dimensioned to accept a substantially cylindrical portion 140 of the bar 115. However, as is shown in FIG. 12, the radial portion 128 does not extend the same distance from the entire circumference of the axial portion 126. Instead, the radial portion 128 defines a pair of radial slots 142, 142' communicating with the aperture 138. The slots 142, 142' are dimensioned to accept a flattened or eye portion 144 located on at least one end of the bar 115.

The outer element 104 is intended to accept and surround the inner element 102, and to apply a compressive force to the inner element 102 to clamp the inner element 102 to the bar 115. To facilitate this, the inner surface 130 of the axial portion 126 is tapered to define an angle, also designated by the character "α" in FIG. 14, within the range of 1° to 5°, and preferably measuring 2°, so that the inner surface 130 of the element 104 can engage the tapered sections 122, 122' of the element 102. The tapered sections 122, 122' and the inner tapered surface 130 provide the locking member 100 with substantially the same benefits as those discussed above with reference to the element 18.

To utilize the locking member 100, the inner element 102, with the portions 106 and 108 separated as shown in FIG. 11, is positioned so that the bar entering end 120 opposes the eye portion 144 of the bar 115. The element 102 is positioned on the cylindrical portion 140 of the bar 115 at a desired position on the bar 115. The element 104 is then positioned such that the bar entering end 134 opposes the eye portion 140. The slots 142, 142' on the element 104 are aligned with the eye portion 144 so that the flattened edges of the eye portion 144 of the bar 115 can pass through the slots 142, 142'. The element 104 is moved along the axis of the bar 115 until the bar entering end 134 contacts the back end 124 of the element 102.

At this point, the elements 102 and 104 can be aligned with respect to each other such that the ends 110, 110', 112, 112' will project into the slots 142, 142' when the elements 102 and 104 are finally assembled. This alignment is optional, but it provides the locking member 100 with significant functional benefits. By aligning the elements 102 and 104 in this manner, the member 100 can take advantage of the fact that the radial forces applied to the outer element 104 by the inner element 102 adjacent the ends 110, 110', 112, 112' are substantially less than similar forces applied to the outer element 104 by other locations along the inner element 102, as discussed below.

Once the elements 102 and 104 have been aligned, force is applied to the elements 102 and 104, thereby forcing the outer element 104 over the inner element 102 so that the back end 124 of the inner element 102 engages the inner surface of the radial portion 128, as shown in FIG. 13. The force required to assemble the elements 102 and 104 together may be on the order of 3,000 lbs.

Further describing the construction of the element 100 by means of example, the following dimensions are preferred if the element 100 is to hold a bar 115 whose cylindrical portion 140 has a diameter of 35 mm. It is to be understood that these dimensions are for the purpose of illustration only, and are not intended to limit the scope of the invention.

To hold the bar 115 within the member 100, the dimension labeled "B" in FIG. 11 measures 17.5 mm so that, when the portions 106 and 108 are shifted into the position shown in FIGS. 13 and 14, a bar accepting diameter labeled "D" in FIG. 14, measuring 35 mm is formed. Thus, the inner diameter of the element 102 is preferably substantially equal to the outer diameter of the bar 115. The distance labeled "A" in FIG. 11 measures 1 mm so that a 2 mm gap 146, shown in FIG. 13, is formed between the ends 112, 112'. This gap allows the member 100 to accommodate bar diameter variations. The sections 119, 119' define a diameter, labeled "E" in FIG. 14, measuring 46 mm and extend 7 mm along the longitudinal axis A3 of the element 102 from the bar entering end 120. The tapered sections 122, 122' define a diameter measuring 52.2 mm at a juncture between the sections 119, 119' and the sections 122, 122', and extend along the longitudinal axis of the element 102 from that juncture 18.3 mm to the back end 124. Prior to insertion of the bar 115 into the element 102, the ends 110, 110', 112, 112' of the portions 106 and 108, respectively, are usually offset by a 40° angle, shown in FIG. 11, to facilitate insertion of the bar 115.

The axial portion 126 of the outer element 104 extends away from the radial portion 128 a distance measuring 18.3 mm with the radial portion 128 having a thickness substantially equal to the thickness of the axial portion 126, viz. the dimension "C" of FIGS. 12 and 14, which measures 1.5 mm. The radial slots 142, 142' are 9.5 mm wide measured circumferentially adjacent the axial portion 126 and the circumferential sides of the slots 142, 142' define a diameter measuring 50.8 mm for accepting the eye portion 144. Thus, the inner diameter defined by the slots 142, 142' is preferably slightly greater than the outer diameter of the eye portion 144 of the bar 115. The radial portion 128 defines an inner diameter of 38.1 mm while the axial portion 126 defines a diameter of 52.0 mm adjacent the bar entering end 134, thereby allowing the outer element 104 to apply a compressive force to the element 102, to clamp the inner element 102 on the bar 115.

In the presently preferred construction, the inner element 102 is formed from a plastic material, preferably of a polysulfone type, such as the plastic material sold by Amoco under the name UDEL GF120. An appropriate additive, such as glass fibers, may be added to the plastic material to provide added strength to the inner element 102. The inner element 102 may be formed from the plastic material by appropriate means, such as injection molding and the like. The outer element 104 is constructed from a metallic material, preferably cold rolled, drawing quality, aluminum killed steel. In the preferred embodiment, a 0.008 mm inch thick coating of zinc is electrodeposited on the steel. To form the outer element 104, the steel is stamped and drawn into the desired shape.

Because the inner diameter of the axial portion 126 is somewhat smaller than the outer diameter of the tapered sections 122, 122', the outer element 104 compresses the inner element 102, which, in turn, applies a clamping force to the bar 115, thereby firmly holding the locking member 100 on the bar 115. Additionally, the tapered locking member 100 on the engagement between the tapered sections 122, 122' and the tapered inner surface 130 insures that this clamping force is directed substantially radially inwardly onto the bar 115.

Once assembled and properly installed on a vehicle, the locking member 100 provides improved functional benefits as compared to the prior art locking members, such as member 18. The locking member 100 provides greater resistance to stresses encountered with maximum tolerances on the stabilizer bar 115. The outer element 104 is stronger than the outer elements of the prior art because it is composed of a metal, and it is also relatively less expensive to manufacture. Because the axial portion 126 exposed to forces that could cause failure of the member 100 is substantially reduced, the axial portion 126 forms a small target for such forces. In addition, the flange or radial portion 128 strengthens the outer member 104 against radial deformation so that the magnitude of push off forces has been increased from 200 lbs to 2,000 lbs. Thus, no latching means, such as the ramps 23, 23' and ridges 30, 30' on the member 18, are needed. The increased structural integrity of the outer member 104 confines the inner member 102 and prevents it also from deforming in an undesirable manner. In addition, the cooperation of the elements 102 and 104 allows the locking member 100 to accommodate variances in bar 115 diameter within ±0.1 mm because the radial portion 128 allows permissible deformation of the element 102, while substantially reducing or preventing undesired deformation of the element 104.

Specifically, because the outer element 104 is formed from steel and the inner element 102 is formed from plastic, the outer element 104 confines the inner element 102 so that portions of the inner element 104 are deformed or caused to flow under pressure to accommodate variations in diameter of the bar 115. The 2 mm gap 146 also allows for bar variances. In addition, the deformability of portions of the inner element 102 provides other benefits. As noted above, the ends 112, 112' are spaced from each other by the gap 146, and, a corresponding gap 148, shown in FIG. 13, may be formed between the ends 110, 110'. The gaps 146, 148 allow portions of the inner element 102 adjacent the gaps 146, 148 to deform or flow into the gaps under pressure. This force-induced flow reduces the magnitude of the radial forces at the portions adjacent the gaps 146, 148. When the gaps 146, 148 are aligned with the slots 142, 142', the lowest magnitude radial force concentration will occur at the slots 142, 142', which may be the weakest location on the element 104.

It is intended that the foregoing detailed description be regarded as illustrative rather than limiting, and that it be understood that it is the following claims, including all equivalents, which are intended to define the scope of this invention.

We claim:

1. A locking member for holding a bar against movement of said bar with respect to said member, said locking member comprising:

an inner element shaped to fit around the bar;
an annular outer element;
the outer element having dimensions sufficient for accepting the inner element; and
the outer element including an inwardly extending flange for strengthening the outer element against radial deformation;
said outer element comprising first and second ends, and said outer element accepting the inner element via the first end;
said flange positioned at the second end such that a leading end of the inner element moves progressively nearer to the flange as the inner element is received in the outer element.

2. The invention of claim 1 wherein the flange extends substantially radially with respect to a center line defined by the outer element.

3. The invention of claim 2 wherein the flange of the outer element defines a plurality of slots for accepting a portion of the bar; said slots being diametrically oppositely disposed on the outer element.

4. The invention of claim 1 wherein the outer element defines a slot for accepting a portion of the bar.

5. The invention of claim 1 wherein the inner element comprises a plastic material.

6. The combination of the locking member of claim 1 with a stabilizer bar wherein the bar is disposed within the inner element; and wherein the inner element is disposed within the outer element.

7. A locking member for holding a bar against movement of said bar with respect to said member, said locking member comprising:

an inner element shaped to fit around the bar;
an annular outer element;
the outer element having dimensions sufficient for accepting the inner element; and
the outer element including an inwardly extending flange for strengthening the outer element against radial deformation;
wherein the flange of the outer element defines a slot for accepting a portion of the bar.

8. A locking member for holding a bar against movement of said bar with respect to said member, said locking member comprising:

an inner element shaped to fit around the bar;
an annular outer element;
the outer element having dimensions sufficient for accepting the inner element; and
the outer element including an inwardly extending flange for strengthening the outer element against radial deformation;
wherein the outer element comprises a metal.

9. A locking member for holding a bar against movement of said bar with respect to said member, said locking member comprising:

an inner element shaped to fit around the bar;
an annular outer element;
the outer element having dimensions sufficient for accepting the inner element; and
the outer element including an inwardly extending flange for strengthening the outer element against radial deformation;
wherein the inner element comprises portions separated from one another by a space dimensioned for accepting material of the inner element deformed by forces applied to the inner element.

10. The invention of claim 9 further comprising a hinge connecting the portions across the space.

11. A locking member for holding a body therein, the locking member comprising:

an inner element;

an annular outer element;

the outer element having dimensions sufficient for accepting the inner element;

the inner element including a tapered section;

the outer element including a tapered section engageable with the tapered section on the inner element for applying a clamping force to the body for holding said body in the locking member, said tapered section of said outer element tapering from a larger diameter portion to a smaller diameter portion; and the outer element including an inwardly extending flange adjacent the smaller diameter portion for strengthening the outer element against radial deformation.

12. The invention of claim 11 wherein the flange defines slots for accepting portions of the body.

13. The invention of claim 12 wherein the slots are diametrically oppositely disposed on the flange.

14. A locking member for holding a body therein, the locking member comprising:

a deformable inner element;

a substantially rigid outer element;

the outer element having a radius and dimensions sufficient for accepting the inner element;

the inner element including a tapered section;

the outer element including a tapered section engageable with the tapered section on the inner element for applying a clamping force to the body for holding said body in the locking member; and the outer element including a flange for supplying the outer element with sufficient structural integrity for permitting deformation of the inner element while strengthening the outer element against radial deformation;

wherein the inner element and the outer element each define a respective longitudinal axis; wherein the tapered section on the inner element and the tapered section on the outer element each define angles with respect to the respective longitudinal axis; and wherein the angles measure within the range of 1 to 5 degrees.

15. A locking member for holding a body therein, the locking member comprising:

a deformable inner element;

a substantially rigid outer element;

the outer element having a radius and dimensions sufficient for accepting the inner element;

the inner element including a tapered section;

the outer element including a tapered section engageable with the tapered section on the inner element for applying a clamping force to the body for holding said body in the locking member; and the outer element including a flange for supplying the outer element with sufficient structural integrity for permitting deformation of the inner element while strengthening the outer element against radial deformation;

wherein the inner element is formed of a plastic material and the outer element is formed of a metal.

16. A locking member for holding a body therein, the locking member comprising:

a deformable inner element;

a substantially rigid outer element;

the outer element having a radius and dimensions sufficient for accepting the inner element;

the inner element including a tapered section;

the outer element including a tapered section engageable with the tapered section on the inner element for applying a clamping force to the body for holding said body in the locking member; and the outer element including a flange for supplying the outer element with sufficient structural integrity for permitting deformation of the inner element while strengthening the outer element against radial deformation;

wherein the inner element comprises a plurality of portions separated from one another by a space dimensioned for allowing deformation of the inner element.

17. A locking member for holding a body therein, the locking member comprising:

a deformable inner element;

a substantially rigid outer element;

the outer element having a radius and dimensions sufficient for accepting the inner element;

the inner element including a tapered section;

the outer element including a tapered section engageable with the tapered section on the inner element for applying a clamping force to the body for holding said body in the locking member; and the outer element including a flange for supplying the outer element with sufficient structural integrity for permitting deformation of the inner element while strengthening the outer element against radial deformation;

wherein the flange defines slots for accepting portions of the body;

wherein the inner element comprises portions separated from one another by a space dimensioned to accept material of the inner element deformed by forces applied to the inner element; wherein the space is aligned with the slots on the flange when the inner element is in the outer element.

18. A locking member for holding a body therein, the locking member comprising:

a deformable inner element;

a substantially rigid outer element;

the outer element having a radius and dimensions sufficient for accepting the inner element;

the inner element including a tapered section;

the outer element including a tapered section engageable with the tapered section on the inner element for applying a clamping force to the body for holding said body in the locking member; and the outer element including a flange for supplying the outer element with sufficient structural integrity for permitting deformation of the inner element while strengthening the outer element against radial deformation;

wherein the body comprises a stabilizer bar; wherein the bar is disposed within the inner element; wherein the inner element is disposed within the outer element.

19. A locking member for holding a body therein, the locking member comprising:

an inner element;

an annular outer element;

the outer element having dimensions sufficient for accepting the inner element;

the inner element including a tapered section;

the outer element including a tapered section engageable with the tapered section on the inner element for applying a clamping force to the body for holding said body in the locking member; and the outer element including a flange for strengthening the outer element against radial deformation;

wherein the flange defines slots for accepting portions of the body;

wherein the inner element comprises portions separated from one another by a space dimensioned to accept material of the inner element deformed by forces applied to the inner element; wherein the space is aligned with the slots on the flange when the inner element is in the outer element.

* * * * *